Patented Nov. 20, 1945

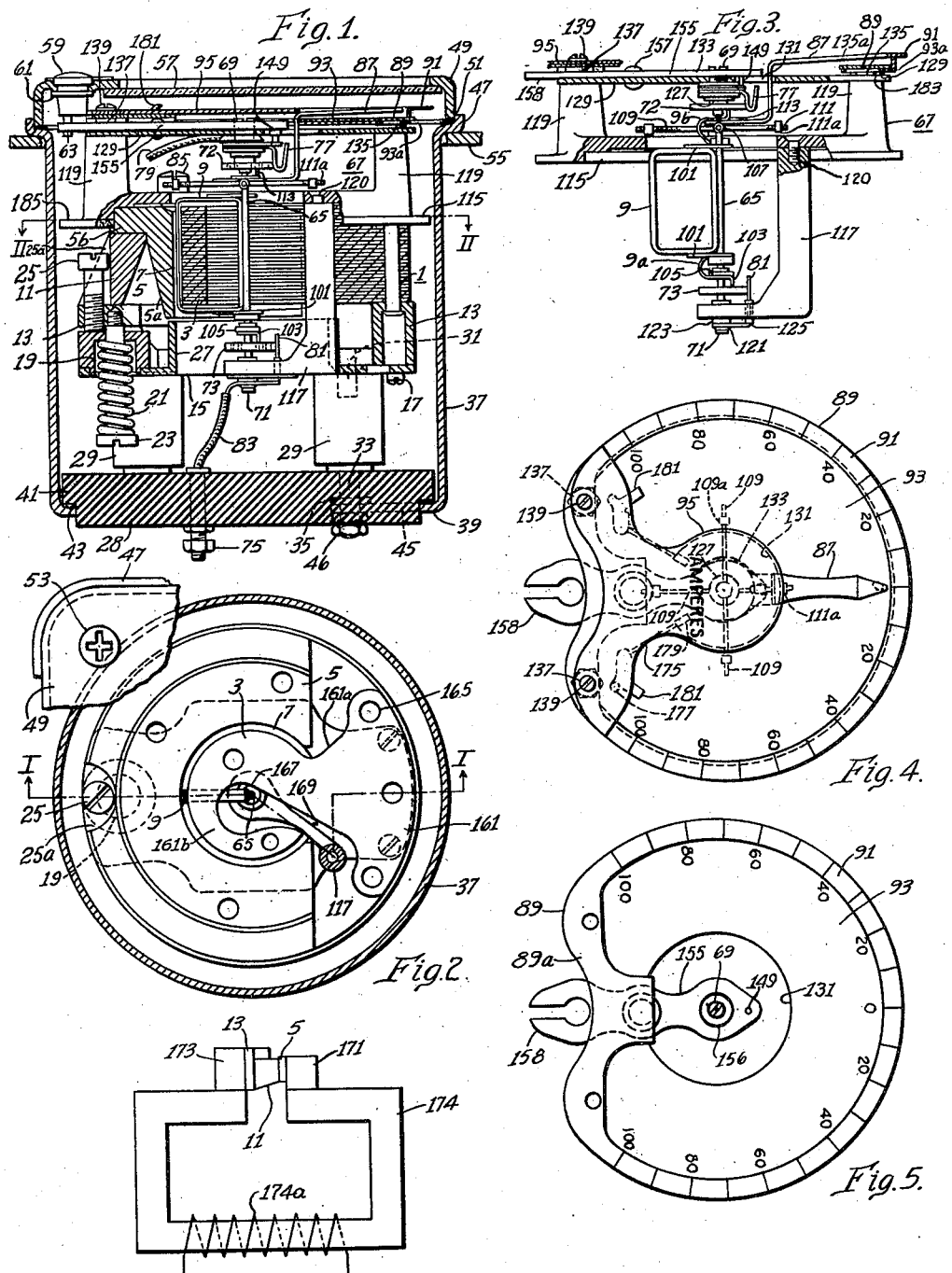

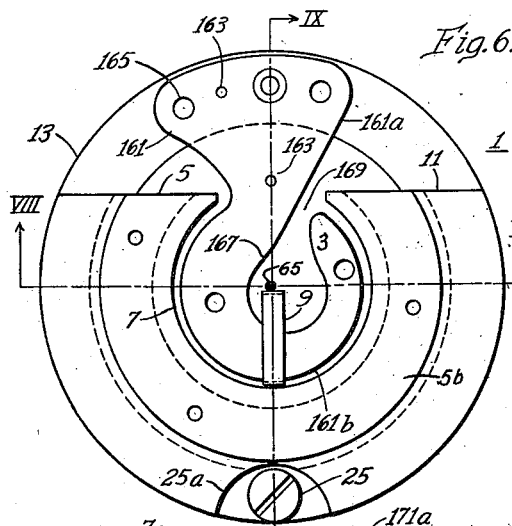
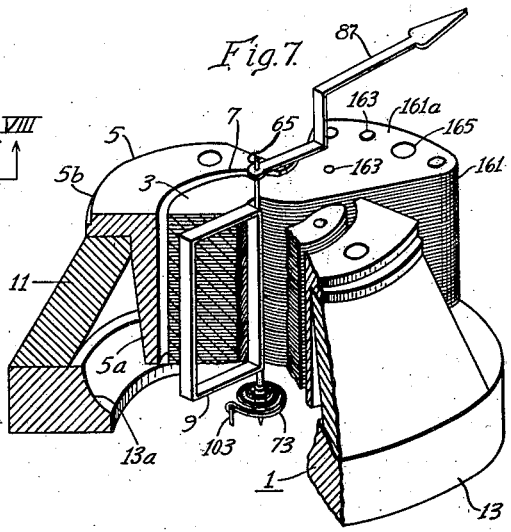
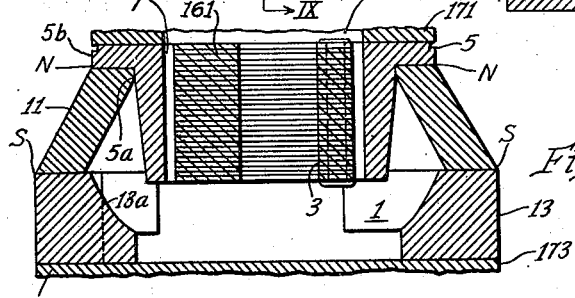
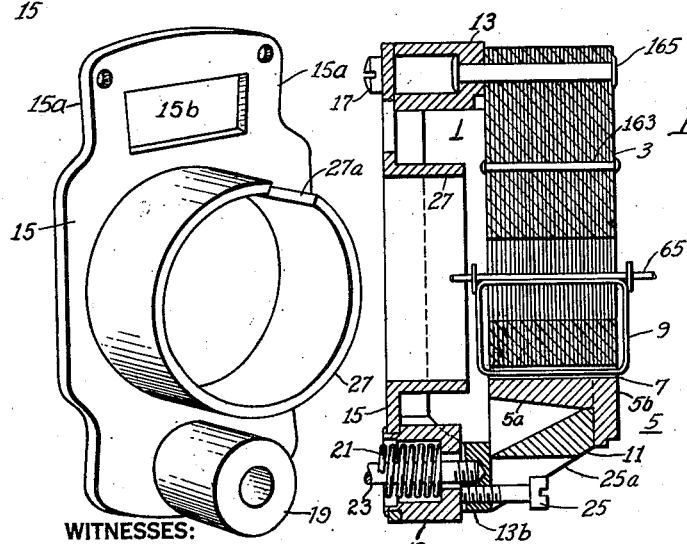
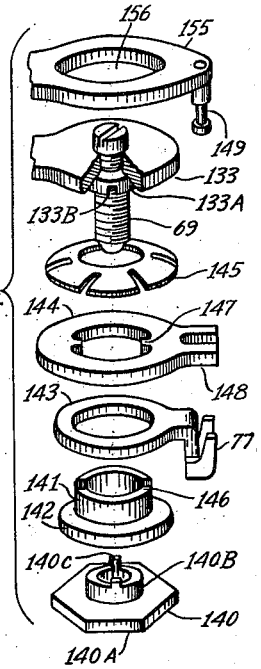

2,389,393

UNITED STATES PATENT OFFICE 2,389,393

ELECTRICAL MEASURING INSTRUMENT

Veron S. Thomander, Maplewood, N. J., assignor to Westinghouse Electric Corporation, East Pittsburgh, Pa., a corporation of Pennsylvania Application September 2, 1943, Serial No. 500,895

33 Claims. (Cl. 171—95)

This invention relates to electromagnetic devices and it has particular relation to electromagnetic devices of the permanent-magnet, moving-coil type which may be employed as electrical-measuring instruments or electrical-relay instruments.

Commercially-employed electromagnetic devices often include magnetic structures capable of producing a magnetic field in an air gap. Such devices are represented by permanent-magnet, moving-coil instruments employed for measuring electrical quantities and also employed as electrical relays. In order to simplify the description of the invention, the description will be directed to permanent-magnet, moving-coil measuring instruments sometimes referred to as D'Arsonval instruments.

The permanent-magnet, moving-coil measuring instrument includes a magnetic structure capable of producing a magnetic field in an air gap. The magnetic flux for the magnetic field is provided by a permanent magnet included in the magnetic structure. A coil has at least one side disposed in the air gap for rotation with respect to the magnetic structure in accordance with the magnitude of electrical current traversing the coil. Instruments of this type are widely employed as ammeters and voltmeters.

In permanent-magnet, moving-coil instruments most commonly encountered, the maximum angle of rotation of the moving coil with respect to its magnetic structure is substantially less than 180°. Although a rotation of this magnitude is satisfactory for many applications of the instrument, there has been an insistent demand for an instrument having a coil capable of rotating through a much larger angle to provide a long, easily-readable scale. In response to this demand, numerous attempts have been made to design a long-scale instrument. However, most of these attempts have failed to produce a commerically-acceptable, long-scale instrument.

Permanent magnets for instruments may be formed from high-coercive permanent-magnet materials. As examples of such materials, reference may be made to 35% cobalt steel which has a coercive force much higher than that of the chromium and tungsten steels often employed in permanent magnets. The nickel-aluminum alloys also provide extremely high coercive forces, a typical alloy of this class comprising an iron alloy containing 20% nickel, 12% aluminum and 5% cobalt. Efficient permanent magnets employing these high-coercive materials generally require much shorter lengths and much larger cross sections than those employed for chromium and tungsten permanent magnet steels.

In one prior-art design employing a high-coercive permanent magnet, the permanent magnet is ring-shaped and is magnetized in a radial direction. In this design, the moving coil can be inserted or removed from its associated magnetic structure only if parts of the magnetic structure are separated.

In accordance with the invention, a permanent-magnet, moving-coil instrument is provided wherein the moving coil may be removed from its associated magnetic structure or inserted therein without disturbing the magnetic structure in any way. To this end, inner and outer pole-pieces are provided which define a cylindrical air gap. The inner pole-piece has openings extending axially therethrough which are configured to permit withdrawal of the moving coil and its supporting structure therethrough. The invention further contemplates the provision of a permanent magnet which substantially surrounds the pole-pieces, and which has pole-faces spaced in an axial direction with respect to the axis of rotation of the moving coil. Although the permanent magnet may be of generally cylindrical form, the preferred shape is substantially a segment of a hollow cone. Such a permanent magnet may be provided with plane pole-faces to facilitate magnetization thereof. Furthermore, the telescoping relation between the pole-pieces and the permanent magnet results in an extremely compact structure.

It is, therefore, an object of the invention to provide an electromagnetic device of improved construction.

It is a further object of the invention to provide an improved permanent magnet suitable for a permanent-magnet, moving-coil device.

It is another object of the invention to provide a permanent-magnet, moving-coil device wherein the permanent magnet is substantially in the form of a segment of a hollow cone.

It is an additional object of the invention to provide an improved permanent-magnet, moving-coil structure wherein the moving coil may be inserted in mounted position or removed therefrom without disturbing the magnetic circuit associated with the permanent magnet.

It is an additional object of the invention to provide improved adjustments for a permanent-magnet, moving-coil instrument.

It is a still further object of the invention to provide a measuring instrument of improved readability.

Other objects of the invention will be apparent from the following description taken in conjunction with the accompanying drawings, in which:

Figure 1 is a view in sectional elevation taken along the line I—I of Fig. 2 of an instrument embodying the invention.

Fig. 2 is a view in top plan with parts broken away along the line II—II of Fig. 1.

Fig. 3 is a view in elevation with parts broken away of a moving-coil assembly and supporting structure therefor suitable for the instrument of Fig. 1.

Fig. 3a is an exploded view in perspective with parts broken away of a spring adjustment suitable for the instrument shown in Fig. 1.

Fig. 4 is a view in top plan of the instrument shown in Fig. 1 with the casing therefor removed.

Fig. 5 is a view in top plan of the dial assembly employed in the instrument of Fig. 1.

Fig. 6 is a view in top plan of the magnetic structure employed in the instrument of Fig. 1.

Fig. 7 is a view in perspective with parts broken away of the magnetic structure illustrated in Fig. 6.

Figs. 8 and 9 are views in cross section taken respectively along the lines VIII—VIII and IX—IX of Fig. 6, with parts omitted and parts added, Fig. 10 is a view in perspective of a magnetic shunt suitable for the instrument of Fig. 1, and Fig. 11 is a view in side elevation of magnetizing apparatus for magnetizing a magnetic structure.

In describing the specific embodiments of the invention illustrated in the drawings, it is believed desirable to describe briefly the relationship of the parts in a complete instrument before proceeding to a detailed description of the various parts. Fig. 1 shows a permanent-magnet, moving-coil instrument wherein a magnetic structure 1 is provided which includes an inner magnetic core 3, which is part of an inner pole-piece, and an outer magnetic pole-piece 5. These magnetic pole-pieces are spaced to define an air-gap 7 within which one side of a coil 9 is disposed for rotation. Although the configurations of the surfaces of the pole-pieces which define the air-gap may vary in accordance with the magnetic field distribution desired, it is assumed for the purpose of discussion that the surfaces are substantially cylindrical and concentric about the axis of rotation of the coil 9.

For producing a magnetic field in the air-gap 7, a permanent magnet 11 is provided which has one pole-face in engagement with the outer magnetic pole-piece 5. The remaining pole-face of the permanent magnet 11 is connected through a magnetic ring 13 to the core 3.

In order to adjust the magnetic field produced in the air-gap 7, a calibrator or magnetic shunt 15 may be provided if desired. This magnetic shunt has one end attached to the magnetic ring 13 by means of suitable screws 17. The shunt may be arranged for adjustment in any suitable manner. In the specific embodiment shown, the opposite end of the magnetic shunt is provided with a cup 19 for receiving a compression spring 21. This compression spring is compressed by means of a screw 23 which is in threaded engagement with the ring 13. By inspection of Fig. 1, it will be observed that the spring urges the left-hand end of the magnetic shunt 15 towards the ring 13. Adjustment of the magnetic shunt is effected by a machine screw 25 which passes through a threaded opening in the ring 13 and abuts against a wall of the cup 19. The screws 23 and 25 may be formed of a suitable non-magnetic material such as brass. By rotation of the screw 25, the shunt may be displaced relative to the ring to vary the position of a cylindrical sleeve 27 formed on the shunt relative to the inner pole-piece 5. Consequently, manipulation of the screw 25 varies the amount of flux shunted away from the air-gap 7.

The magnetic structure 1 may be supported on a cylindrical base 28 of suitable insulating material, such as a phenolic resin, in any suitable manner. As illustrated in Fig. 1, a plurality of pillars 29 are provided. These pillars may be formed of a suitable insulating material such as a phenolic resin. One end of each of the pillars 29 is provided with a stud 31 which is received in a threaded opening provided in the ring 13. At its opposite end each of the pillars 29 is provided with a stud 33 which passes through an opening in the base 28 and is secured thereto by means of a suitable nut 35. The casing further may include a cylindrical shell 37 which surrounds the magnetic structure 1 and which has a ring-shaped flange 39 formed at one end for engagement with a corresponding cylindrical flange 41 formed on the base 28. A gasket 43 may be interposed between these flanges to provide a seal therebetween. At intervals, the flange 39 has ears 45 projecting therefrom. Each of these ears has an opening positioned to receive one of the studs 33. Nuts 46 associated with the studs 33 secure the shell 37 to the base 28.

At its opposite end, the shell 37 has a flange 47 formed for reception of a cap 49. The flange 47 and the cap 49 may have any desired outline but are illustrated (Fig. 2) as substantially square in outline. A gasket 51 interposed between the cap 49 and the flange 47 seals the joint therebetween. As shown in Fig. 2, machine screws 53 may be employed for securing the cap 49 to the flange 47. Although the casing may be mounted on any suitable support, it is illustrated in Fig. 1 as mounted on a panel 55 having an opening through which the shell 37 may be inserted. The casing may be secured to the panel 55 in any suitable manner as by machine screws (not shown).

The cap 49 has a transparent window 57 through which may be viewed portions of the indicating instrument contained within the casing. This window 57 may be secured to the cap in any suitable manner as by adhesive. In addition, the cap 49 has an adjusting button 59 extending through an opening therein and rotatable with respect thereto. This button 59 has a head positioned on the outside of the cap 49 and a resilient split ring 61 positioned in a groove adjacent the inner surface of the cap to retain the button in position. At its lower end the button is provided with a pin 63 which is eccentrically mounted with respect to the axis of rotation of the button. As hereinafter pointed out, the button 59 is for the purpose of adjusting the position of the moving coil 9 with reference to the magnetic structure.

Returning now to the coil 9, it will be observed that the coil is mounted on a shaft 65. This shaft is mounted for rotation in a supporting structure 67 between a pair of bearing screws 69 and 71. In addition to the coil 9, the shaft 65 carries a pair of spiral springs 72 and 73 which are employed not only to bias the coil 9 towards a predetermined position with respect to its magnetic structure but also to conduct current from the terminals of the coil 9 to terminal screws 75 mounted on the base 28. By inspection of Fig. 1, it will be observed that the outer end of the spring 72 is attached to a support 77 which, in turn, is soldered to a conductor 79 employed for connecting one terminal of the coil to one of the terminal screws. In a similar manner, the outer end of the spring 73 is soldered to a lug 81 which is connected through a conductor 83 to an additional terminal screw 75.

The supporting structure 67 is attached to the outer pole piece 5 by means of cap screws 85. The support is so configured that if the cap screws 85 are removed and the conductors 79 and 83 are detached from the coil assembly, the entire coil assembly and its supporting structure 67 can be removed in an axial direction as a unit from the magnetic structure 1 without disturbing the magnetic structure in any way.

The shaft 65 in addition carries a pointer 87 which projects through a central opening in a ring-shaped dial member 89 and has a tip portion overlying the dial member. By inspection of Fig. 1, it will be observed that the dial member 89 is dished to provide a raised peripheral rim 91 on which scale divisions may be printed or otherwise applied as illustrated in Fig. 4. Since the tip of the pointer 87 is adjacent and substantially in the same plane as the rim portion 91, errors resulting from parallax are avoided.

The dial member 89 preferably carries a separate dial plate 93 on which the numbers corresponding to various points on the scale are printed or otherwise applied as shown in Figs. 4 and 5. Depending on the design and adjustment of the springs 72 and 73, the zero indication of the instrument may be located at various points on the scale, such as at the left end thereof, or the zero may be suppressed. For the purpose of illustration, however, Figs. 4 and 5 show a "center zero" instrument wherein the zero indication is at the center of the scale.

The central opening in the dial member 89 is substantially covered by a shield or mask plate 95 which is disposed between the dial member 89 and the window 57, and which may be similar in basic color and appearance to the dial plate 93. This mask plate not only improves the appearance of the instrument but increases the readability of the instrument for the reason that it obscures parts of the coil assembly which would tend to draw attention from the pointer 87. In addition, data such as scale constants and type designations (represented in Fig. 4 by the word "amperes") may be readily printed on the mask plate. Such data is not obscured by the pointer and remains on the instrument movement when the casing is removed therefrom. Also the mask plate prevents debris from entering the central opening in the dial plate when the instrument is removed from its case. By inspection of Fig. 1, it will be observed that the mask plate 95 is positioned slightly above a portion of the pointer 87. For this reason, the mask plate assists in preventing excessive axial movement of the pointer in response to shock.

The general relationship of the parts having been set forth, it is believed that a detailed description of the parts now may be given. In Fig. 3, the coil assembly and its supporting structure are shown removed from the remainder of the measuring instrument. The coil 9 may be formed in the conventional manner by winding a plurality of turns of insulated copper wire about a rectangular strip of electro-conductive material such as aluminum which, as well understood in the art, serves to damp movements of the coil assembly. The coil may be attached to the shaft 65 by cementing and/or clamping the coil to a pair of spaced brackets 101 which are secured to the shaft. The inner end of the spring 73 is soldered or otherwise attached to a strip 103 of conductive material. This strip in turn is secured to an insulating bushing 105 which is attached to the shaft 65. One terminal 9a of the coil 9 is soldered to the strip 103.

The shaft 65 also carries a collar 107 to which are attached a plurality of balance arms 109 and 111, the pointer 87 and a lug 113. The inner end of the spring 72 is attached by soldering or otherwise to the lug 113 which is formed of conductive material. The lug in turn is connected to the remaining terminal 9b of the coil 9. The springs 72 and 73 may be formed of a conductive material such as bronze or a beryllium-copper alloy.

The parts thus far described as associated with the shaft 65 in Fig. 3 may be termed a coil assembly which may be mounted as a unit in the supporting structure 67. This supporting structure includes a ring-shaped platform 115 through which the coil assembly passes. An L-shaped bracket 117 is suitably secured to one face of the platform 115 and pillars 119 project from the remaining face thereof. If desired, the platform 115, bracket 117 and the pillars 119 may be cast integrally from a suitable material such as aluminum. Alternatively the bracket 117 may be attached to the platform 115 by means of a machine screw 120 (Fig. 1). The lower end of the bracket 117 carries a hollow internally threaded rivet 121 which is employed for attaching an insulating bushing 123 to the bracket. This bushing passes through and secures to the bracket the strip 81 which has an end passing through the bracket 117. As shown in Fig. 3, an insulating tube 125 surrounds the portion of the strip 81 which passes through the bracket. This tube is cemented to the bracket 117. As previously pointed out, the strip 81 is soldered to the outer end of the spring 73 and serves to conduct current passing through the spring 73 and also serves as an anchor for the outer end of the spring. The bearing screw 71 threadedly engages the internal threads of the hollow rivet 121 and provides a jewel bearing for reception of one end of the shaft 65.

The remaining bearing screw 69 is in threaded engagement with a bridge plate 129 and secures to the bridge plate an adjustable assembly for adjustably positioning the outer end of the spring 72. The bridge plate 129, as more clearly shown in Fig. 4, has a central opening 131 for permitting rotation of the pointer 87 with respect thereto. In addition, the bridge plate has a bridge arm 133 projecting into the opening 131 for reception of the bearing screw 69 (Fig. 3). The bridge plate 129 may be secured to the pillars 119 by means of a machine screw 135 and a pair of cap screws 137 (Fig. 3). As shown in Figs. 1 and 4, the cap screws 137 may have a threaded opening for reception of smaller cap screws 139 employed for attaching the shield or mask plate 95 and the dial member 89 to the supporting structure 67. As shown in Fig. 5 the dial member 89 may have a portion 89a in the plane of the rim 91 for receiving the screws 139 and for clearing a zero adjusting lever to be described below.

As well understood in the art, the coil assembly should be balanced with respect to its axis of rotation. Since the coil 9 generally tends to overbalance the pointer 87, the balance arm 111 is provided with a weight 111a. The weight may be adjusted to overbalance slightly the coil 9. Final balancing of the coil assembly then may be effected by adjusting weights 109a threadedly engaging the balance arms 109.

As shown more fully in Fig. 3a, the assembly for controlling the spring surrounds the bearing screw 69 and is positioned between the arm 133 and the head 140A of a lock nut 140 which is in threaded engagement with the bearing screw. A bushing 133A provided with slot 133B is attached to the arm 133. The lock nut 140 has a sleeve 140B for engaging the bushing 133A to space the head 140A of the lock nut from the arm 133. This sleeve has lugs 140C positioned for reception in the slots 133B to prevent relative rotation between the lock nut 140 and bushing 133A.

A bushing 141 rotatably surrounds the sleeve 140B and has a flange 142 at one end. A pair of rings are mounted on the bushing 141 and are resiliently biased against each other and against the flange 142 by a spring washer 145 which surrounds the bushing 133A. The bushing 141 has slots 146 for receiving lugs 147 on the ring 144, whereby the bushing and the ring 144 rotate as a unit about the sleeve 140B. The support 77 for the spring 72 is secured to the ring 143. The ring 144 carries a forked member 148 for receiving a pin 149 projecting from a zero adjuster lever 155. When the lever 155 is actuated to rotate the ring 144, the rings 143 and 144 together with the bushing 141 rotate as a unit about the sleeve 140B. If desired, the engaging faces of the rings 143 and 144 may be suitably roughened to increase the frictional engagement therebetween.

The lever 155 has an opening 156 providing clearance about the bearing screw 69 and is pivotally secured to the bridge plate 129 by means of a rivet 157 (Fig. 3). The lever 155 has a fork 158 projecting about the pin 63 (Fig. 1). Consequently, rotation of the button 59 actuates the lever 155 to vary the position of the end of the spring 72. In addition, the end of the spring may be moved against the friction resistance of the rings 143 and 144 (Fig. 3a) by forcing the support 77 in the desired direction relative to the fork 148.

With this construction, the support 77 may be placed initially in approximately the desired position by moving the support 77 with respect to the fork 148. Subsequent adjustment of the spring may be effected by manipulation of the button 59. Although a similar adjustment could be provided for the spring 73 preferably only the adjustment illustrated is provided. To provide an adequate range of adjustment, the spring 72 may be designed to provide the major proportion of the biasing torque applied to the shaft 65. As a specific example, the spring 72 may be designed to exert a biasing torque for a predetermined rotation of the shaft 65 which is twice that of the spring 73.

The construction of the magnetic structure 1 is clearly illustrated in Figs. 6 to 9. It will be observed that the inner magnetic core 3 forms a portion of a hook unit 161 having a shank section 161a and a hook section 161b. This hook unit 161 may be formed of solid metal but preferably is formed of a plurality of laminations which are united in any suitable manner as by means of rivets 163. The hook unit may be secured to the ring 13 in any desired manner as by means of additional rivets 165. The outer pole-piece 5 has a cylindrical section 5a which is spaced from the inner core 3 to define the air-gap 7. A ring-shaped flange 5b projects from the cylindrical section for engaging one pole-face of the permanent magnet 11.

The hook unit 161, the outer magnetic pole-piece 5 and the ring 13 may be formed of any suitable magnetic material having good magnetic permeability. Preferably these parts are formed of a magnetic material incapable of retaining a permanent magnetism (that is, having no residual induction) such as soft iron or steel. The outer pole-piece 5 and the ring 13 may be secured to the permanent magnet 11 in any suitable manner as by welding these parts together if the magnet 11 is of a weldable material such as cobalt steel.

If the magnet 11 is formed of one of the aluminum-nickel alloys, it may be silver-soldered to the outer pole-piece 5 and to the ring 13. The permanent magnet 11 is suitably spaced from the cylindrical section 5a of the outer pole-piece, and preferably the sides of the permanent magnet are inclined as illustrated more particularly in Figs. 7 and 8. In the preferred embodiment, the permanent magnet 11 has the form of a segment of a frustum of a right circular cone. The permanent magnet 11 is magnetized along a slant height to provide pole-faces which are in the form of rings concentric about the axis of rotation of the coil 9. For the purpose of illustration the upper pole face in Fig. 8 is designated a north pole-face N, whereas the lower pole-face is designated a south pole-face S. It will be observed that the magnet 11 is somewhat U-shaped, and has inner and outer surfaces which are portions of concentric conical surfaces.

The pole faces N and S of the permanent magnet 11 lie in parallel, spaced planes. The pole piece 5 has a portion or section 5a positioned substantially between these planes, and has a portion in the form of a flange 5b adjacent the pole face N.

As shown more particularly in Figs. 2 and 6, the hook unit 161 has an axial opening 167 extending therethrough which is eccentrically located with respect to the outer cylindrical surface of the inner core 3. The opening 167 is so positioned that the hook section 161b has a cross section which tapers from a large value adjacent the shank section 161a to a smaller value distant from the shank section. Since all of the magnetic flux passing through the air-gap 7 also passes through the shank section 161a it follows that the total flux in the hook section 161b decreases from a large value adjacent the shank section to a smaller value distant from the shank section. Consequently, the flux density is maintained at a reasonably low value at any point in the hook section 161b despite its tapering configuration. This construction assures efficient utilization of magnetic material and, in addition, provides a maximum size of the opening 167 to facilitate entry and removal of the coil assembly therethrough. The tip of the hook section 161b is terminated at a point displaced from the shank section by a distance sufficient to provide a channel 169 large enough to pass the coil 9 when the coil assembly is introduced in or removed from the core 3. It will be understood further that the L-shaped bracket 117, as more particularly shown in Fig. 2, also is proportioned to pass through the opening 167 and the channel 169 during removal and insertion of the supporting structure 67 with respect to the magnetic structure 1. The outer magnetic pole-piece 5 and the magnet 11 terminate along a chordal plane to provide ample room for passage of the bracket 117 and to prevent excessive magnetic leakage between the outer pole piece 5 and the shank 161a.

The construction of the magnetic structure is such that the ring 13 may be placed on a magnetic table with substantially no effect on the magnetic field in the air gap 7. This is for the reason that the entire ring 13 is of a common magnetic polarity and the cylindrical section 5a of the outer pole-piece is displaced appreciably from the ring 13. This is extremely advantageous for the reason that such instruments often are employed for table operation. Furthermore, this greatly simplifies the care required to prevent demagnetization during assembly and servicing of the measuring instrument. The compactness afforded by this construction also is apparent from a study of Fig. 1. It will be observed that the pole-pieces are nested within the permanent magnet 11 with a substantial reduction in the required height of the instrument. Furthermore, the ring 13 does not add to the overall height of the measuring instrument for the reason that the spring 73 and the lower bearing for the coil assembly are positioned substantially within the ring.

The desirability of the tapered construction of the permanent magnet 11 also may be discussed with reference to Fig. 1. It will be observed that the major diameter of the permanent magnet is substantially equal to the diameter of the ring 13. Consequently, all portions of the permanent magnet and ring 13 which are adjacent the casing are of substantially the same magnetic polarity. As a result, the shell 37 may be constructed of a magnetic material to form a magnetic shield for the measuring instrument without appreciably weakening the field produced within the air-gap 7. This is advantageous not only as a shield against external magnetic fields but facilitates the mounting of the instrument with substantially no change in calibration on panels 55 of magnetic material as well as on panels of nonmagnetic material. At the same time, the tapered construction of the permanent magnet provides adequate clearance between the lower end of the permanent magnet as viewed in Fig. 1 and the lower end of the outer magnetic pole-piece 5. Additional clearance may be provided by tapering the outer wall of the cylindrical section 5a as illustrated in Figs. 1 and 7 to 9. Since the flux in the air-gap 7 all passes through the ring flange 5b of the outer pole-face, it follows that the total flux in the cylindrical section 5a decreases in a transverse plane in accordance with the distance of the transverse plane from the flange 5b. Consequently, a reasonably low magnetic flux density may be maintained in the cylindrical section 5a despite the tapering of this section to increase the distance between the lower end of the section and the lower pole-face of the permanent magnet. Additional clearance may be provided by recessing the upper inner edge of the ring 13 as viewed in Fig. 8 to provide a surface 13a substantially displaced from the lower end of the cylindrical section 5a.

A great advantage of the magnetic structure herein described is that it may be readily magnetized between parallel plane pole-faces. If desired, a pair of pole-pieces for magnetizing the magnetic structure may take the form of the pole-pieces 171 and 173 shown in Figs. 8 and 11. The lower pole-piece 173 (Fig. 8) has substantially a plane surface whereas the upper pole-piece 171 may have a recess 171a to space the pole-piece from the core 3. The pole-pieces 171 and 173 may be positioned on the polar ends of a U-shaped magnetic member 174 having a magnetizing winding 174a thereon. When a direct current of sufficient magnitude is passed through the winding 174a the permanent magnet 11 is magnetized, the theory of magnetization being well understood in the art. The magnetic structure next is withdrawn from the pole-pieces 171 and 173. Since the core 3 is permanently attached to the remainder of the magnetic structure, no keeper is required for the permanent magnet 11 following magnetization thereof or during subsequent servicing operations on the measuring instrument. This is particularly advantageous for field servicing of the measuring instrument.

It will be observed that the permanent magnet 11 is provided with a notch 25a (Figs. 1, 2 and 6) to provide clearance for the adjusting screw 25.

As previously explained, the calibrator or magnetic shunt 15 (Fig. 1) is provided with a cylindrical sleeve 27 similar in cross-section to the lower end of the outer pole-piece 5. This cylindrical sleeve, as shown in Fig. 10, is provided with a recess 27a providing clearance for the bracket 117. In addition, one end of the shunt may be provided with an opening 15b leaving strips 15a as shown in Fig. 10 to reduce the cross section of the shunt adjacent the opening and to facilitate flexure of the shunt in this area. The ends of the shunt establish parallel magnetic paths from the sleeve 27 to the ring 13. When the free end of the magnetic shunt is actuated away from the ring 13 by operation of the screw 25, saturation of the strips 15a reduces the magnetic flux shunted away from the air-gap 7 to an extremely small value. Such a shunt provides a large range of adjustment of the sensitivity of the instrument and greatly facilitates calibration thereof. It will be understood that the ring 13 is provided with a recess or notch 13b to provide clearance for the cup 19 affixed to the shunt 15 (see Fig. 9). The shunt may be formed (as by a drawing operation) from a "soft" magnetic sheet material, such as soft iron or steel. Since the cylindrical sleeve is substantially symmetrical with respect to the air-gap 7, the shunt does not distort the scale distribution of the instrument. The shunt also acts as an additional magnetic shield for the permanent magnet 11.

To stop the pointer 87 at the extreme ends of its travel, a pair of spring arms 175 may be attached to the back face of the dial member 89 by means of rivets 177 (Fig. 4). These arms have sleeves 179 of porcelain or other suitable material at their ends in the path of movement of the pointer 87 to bring the pointer gently to a stop when it tends to overshoot the normal ends of its travel. The rivets 177 also may be employed for attaching the plate 93 to the dial member 89 and for attaching some auxiliary stops 181 thereto. As more particularly shown in Fig. 1, the auxiliary stops 181 are inclined upwardly from the dialed member to prevent the pointer 87 from jumping over the mask plate 95. To facilitate securing the dial member 89 in position, the dial member may be provided with a lip 183 (Fig. 3) positioned beneath a flange 135a on the screw 135 when the dial member is in mounted position. Further support for the plate 93 may be obtained by extending a tongue 93a therefrom through an opening provided in the dial member 89 (Fig. 1).

If the measuring instrument is to be subjected to appreciable shock, it may be desirable to provide a bumper ring 185 of any suitable material such as a phenolic resin (see Fig. 1). This ring may be positioned between flanges on the platform 115 and the outer pole-piece 5.

In assembling a measuring instrument in accordance with the invention, it will be appreciated that the magnetic structure 1 is first completely assembled and magnetized. The coil assembly and supporting structure assembled as illustrated in Fig. 3 then are positioned over the magnetic structure with the shaft 65 in alignment with the center line of the opening 167. In addition, the coil 9 and the bracket 117 are positioned for reception in the channel 169. This means that the coil 9 is rotated from the position illustrated in Fig. 3, to a position wherein the coil lies substantially between the shaft 65 and the bracket 117. With the parts in these positions, the coil assembly and its supporting structure may be moved axially relative to the magnetic structure until the coil 9 is in a position to embrace the inner core 3. At this point, the coil assembly and its supporting structure are moved radially with respect to the magnet structure to bring the shaft 65 into alignment with the axis of the magnetic structure. In this position, the screws 85 may be inserted to attach the supporting structure of the coil assembly firmly to the magnetic structure. When the coil 9 is released, it is in proper position to rotate into the position illustrated in Fig. 2 wherein the coil embraces the hook section 161b. If the bumper 185 is to be provided, it is positioned on the magnetic structure 1 prior to the positioning of the coil assembly and supporting structure therein. It will be clear that a reverse procedure may be employed for removing the coil assembly and its supporting structure from the magnetic structure. It is believed that the assembly of the measuring instrument in its casing and the attachment thereto of the dial member and mask plate are clearly apparent from the foregoing discussion.

After the magnetic structure 1 is assembled and magnetized, the magnetic circuit thereof is not disturbed. If any adustment of the air-gap flux is desired the shunt 15 is provided.

The provision of a permanently assembled magnetic structure eliminates the need for special fixtures, such as magnetic keepers, and greatly simplifies the assembly and disassembly of the complete measuring instrument. The ease with which the moving coil assembly is removed from the magnetic structure facilitates repair work on the instrument.

Although the invention has been described with reference to certain specific embodiments thereof, numerous modifications are possible. Therefore, the invention is to be restricted only by the appended claims.

I claim as my invention:

1. In a permanent-magnet moving-coil device having parts located between a pair of parallel, spaced planes, a first magnetic pole-piece positioned substantially between said planes, a second magnetic pole-piece spaced from said first magnetic pole-piece to define therewith an air-gap positioned substantially between said planes, a permanent magnet substantially positioned between said planes and having first and second magnetic pole-faces disposed respectively substantially in said spaced planes, said first and second magnetic pole-pieces having portions cooperating respectively with said pole-faces for directing magnetic flux from said permanent magnet through said air-gap, a coil having a portion disposed in said air-gap, and means mounting said coil for rotation about an axis intercepting said planes.

2. In a permanent-magnet moving-coil device, a magnetic structure having an air-gap, a coil, means mounting at least a portion of said coil in said air-gap for rotation with respect to said magnetic structure about a predetermined axis, said magnetic structure comprising a first magnetic pole-piece, a second magnetic pole-piece spaced from said first magnetic pole-piece, said pole-pieces having spaced faces defining said air-gap, each of said pole-pieces having a surface extending substantially perpendicular to said axis, said surfaces facing each other and being spaced in a direction parallel to said axis, said surfaces occupying substantially the same angular position relative to said axes, and a permanent magnet extending between said surfaces for directing magnetic flux into said air-gap.

3. In a permanent-magnet moving-coil device, a magnetic structure having an air-gap, a coil, means mounting at least a portion of said coil in said air-gap for rotation with respect to said magnetic structure about a predetermined axis, said magnetic structure comprising a first magnetic pole-piece, a second magnetic pole-piece spaced from said first magnetic pole-piece, said pole-pieces having spaced faces defining said air-gap, each of said pole-pieces having a surface extending substantially perpendicular to said axis, said surfaces facing each other and being spaced in a direction parallel to said axis, and an arcuate permanent magnet having an axis coinciding with said predetermined axis and extending between said surfaces for directing magnetic flux into said air-gap, said permanent magnet having ring-shaped pole-faces concentric about said predetermined axis and respectively substantially in engagement with said surfaces.

4. In a permanent-magnet moving-coil device, a magnetic structure having an air-gap concentric about a pre-determined axis, a coil, means mounting at least a portion of said coil in said air-gap for rotation with respect to said magnetic structure about said predetermined axis, said magnetic structure comprising a first magnetic pole-piece, a second magnetic pole-piece spaced from said first magnetic pole-piece, said pole-pieces having spaced faces defining said air-gap, each of said pole-pieces having a surface extending substantially perpendicular to said axis in a separate one of two planes between which a substantial portion of said air-gap is located, said surfaces facing each other and being spaced in a direction parallel to said axis, and an arcuate permanent magnet having an axis coinciding with said predetermined axis and extending between said surfaces for directing magnetic flux into said air-gap, said permanent magnet having ring-shaped pole-faces concentric about said predetermined axis and respectively in engagement with said surfaces.

5. In a permanent-magnet moving-coil device, a magnetic structure having an arcuate air-gap, a coil, and means mounting said coil for rotation relative to said magnetic structure about a predetermined axis, said coil having a side extending substantially parallel to said axis and positioned in said air-gap for movement therethrough in response to said rotation, said magnetic structure comprising a permanent magnet having poles spaced apart in a direction parallel to said axis, and means associated with the poles of said permanent magnet for directing magnetic flux through said air-gap.

6. In a permanent-magnet moving-coil device, a magnetic structure having an arcuate air-gap, a coil, and means mounting said coil for rotation relative to said magnetic structure about a predetermined axis, said coil having a side extending substantially parallel to said axis and positioned in said air-gap for movement therethrough in response to said rotation, said magnetic structure comprising a permanent magnet substantially surrounding said air-gap and having a component of magnetization in a direction parallel to said axis for directing magnetic flux through said air-gap.

7. In a permanent-magnet moving-coil device, a magnetic core, a coil having a side positioned adjacent an exterior surface of said magnetic core, means mounting said coil for rotation relative to said magnetic core about an axis so located that rotation of said coil moves said side of said coil in a path adjacent said exterior surface of the magnetic core, a permanent magnet substantially surrounding said magnetic core, said permanent magnet having at least a component of magnetization parallel to said axis, and means for directing magnetic flux from said permanent magnet through the path of said coil side and through said magnetic core.

8. In a permanent-magnet moving-coil device, a cylindrical magnetic core, a coil having a side positioned adjacent the cylindrical surface of said magnetic core, means mounting said coil for rotation relative to said magnetic core about the axis of said magnetic core, a permanent magnet subtantially surrounding said magnetic core, said permanent magnet being magnetized in a direction oblique to said axis, and means for directing magnetic flux from said permanent magnet through the path of said coil side and through said magnetic core.

9. In a permanent-magnet moving-coil device, a magnetic core having a cylindrical peripheral surface, a coil, means mounting said coil for rotation relative to said magnetic core about the axis of said surface, said coil having a side movable about said cylindrical surface and adjacent thereto in response to rotation of said coil relative to the magnetic core, a permanent magnet substantially in the form of at least a segment of a frustum of a hollow, circular cone surrounding a substantial part of said magnetic core, said permanent magnet being magnetized substantially in the direction of its slant height, magnetic means connecting said magnetic core to a first pole-face of said permanent magnet, a pole-piece surrounding a substantial part of said magnetic core to define therewith an air-gap through which said coil side is movable, and means associating said pole-piece with a second pole-face of said permanent magnet for cooperation with said magnetic core in directing magnetic flux from said permanent magnet through said air-gap.

10. In a device utilizing magnetic flux, a magnetic structure including a hook-shaped magnetic element for providing a magnetic circuit, said magnetic element comprising a magnetic shank having at one end a magnetic hook, said hook having an inner opening proportioned to provide a hook cross-section tapering gradually from a large value adjacent said shank to a smaller value at a distance from said shank, and means for directing magnetic flux through said shank and the outer surface of said hook, magnetic-flux-responsive-means disposed in the path of magnetic flux passing through the outer surface of said hook, and means mounting said magnetic-flux-responsive-means in operative position relative to said magnetic structure, said mounting means comprising means designed to pass through said opening into and out of operative position.

11. In a permanent-magnet moving-coil device, a magnetic structure including a hook-shaped element, said hook-shaped element comprising a magnetic shank, and a magnetic hook projecting from said shank, said hook having an arcuate outer peripheral surface and an inner opening proportioned to provide a hook cross-section tapering gradually from a large size adjacent said shank to a smaller size at a distance from said shank, and magnetic means spaced from said outer peripheral surface to define therewith an arcuate gap, said magnetic means including means for directing through said gap, said hook and said shank in series a magnetic flux, a coil assembly including a coil having a first side disposed in said gap and a second side disposed in said opening, means mounting said coil assembly for rotation relative to said magnetic structure about an axis passing through said opening, said coil assembly being proportioned for removal from and installation in operative mounted position through said opening and the channel separating said shank from the tip of said hook.

12. In a permanent-magnet moving-coil device, a magnetic structure including a hook-shaped element, said hook-shaped element comprising a magnetic shank, and a hook projecting from said shank, said hook having an arcuate outer peripheral surface and an inner opening proportioned to provide a hook cross-section tapering gradually from a large size adjacent said shank to a smaller size at a distance from said shank, and magnetic means spaced from said outer peripheral surface to define therewith an arcuate gap, said magnetic means including means for directing through said gap, said hook and said shank in series a magnetic flux, a coil assembly including a coil having a first side disposed in said gap and a second side disposed in said opening, shaft means projecting from said coil on opposite sides of said opening, and separate spring means secured to said shaft means on each side of said coil for connecting the terminals of said coil to an external electrical circuit, means mounting said coil assembly for rotation relative to said magnetic structure, about an axis passing through said opening, said coil assembly including at least one of said spring means being proportioned for removal from, and installation in, operative mounted position through said opening and the channel separating said shank from the tip of said hook.

13. In a permanent-magnet moving-coil device, a magnetic core having a substantially cylindrical surface, said magnetic core having an axial opening therein which is eccentrically positioned relative to said cylindrical surface and which contains the axis of said cylindrical surface to provide an annular magnetic core of varying cross-section, a coil assembly including a coil having a first side positioned adjacent the exterior of said cylindrical surface and having a second side disposed in said opening, said magnetic core having a channel extending radially from said opening through a portion of said magnetic core of small cross-section for permitting withdrawal of said coil therethrough, means mounting said coil assembly for rotation about an axis passing through said opening, and a magnetic structure including a magnetic member adjacent a portion of said annular magnetic core of large cross-section for directing magnetic flux in series through said magnetic member, said magnetic core and the path of rotation of said first coil side, said magnetic structure comprising a permanent magnet surrounding a substantial part of said magnetic core and having at least a component of magnetization in a direction parallel to the axis of said cylindrical surface, means connecting said magnetic core to a first pole-face of said permanent magnet, and magnetic means connected to a second pole-face of said permanent magnet for defining with said cylindrical surface an arcuate air-gap within which said first side of the coil is movable, a separate spiral spring attached at its inner end to said coil assembly on each side of said magnetic core when said coil assembly is in mounted position, means attaching the outer end of each of said spiral springs to said magnetic structure, at least one of said springs when its outer end is disconnected from said magnetic structure being proportioned to pass through said opening as said coil is withdrawn from said magnetic core.

14. In a permanent magnet device, a pair of magnetic pole-pieces spaced to direct magnetic flux through an air-gap therebetween in directions all parallel to a predetermined plane, said air-gap being arcuate about an axis which intercepts said plane, and a permanent magnet configured to extend around substantial parts of said pole-pieces in a direction parallel to said plane, said permanent magnet having at least a substantial component of magnetization in a direction transverse to said plane, and said permanent magnet having its pole-faces connected respectively to said pole-pieces for establishing a magnetic field in said air-gap.

15. In a permanent-magnet device, a pair of spaced magnetic pole-pieces defining an air-gap substantially arcuate about a predetermined axis, an encircling, at least substantially U-shaped permanent magnet substantially surrounding said magnetic pole-pieces and said axis, said permanent magnet having at least a substantial component of magnetization in a direction parallel to said axis, and means connecting said permanent magnet in magnetic series circuit relationship with said pole-pieces to establish a magnetic field in said air-gap.

16. In a permanent-magnet device, an annular structure comprising an annular magnetic member, and an annular permanent magnet mounted on said annular magnetic member, said permanent magnet having at least a substantial component of magnetization in a direction transverse to the plane of said annular structure, a pair of magnetic pole-pieces disposed substantially within said permanent magnet, and means including said annular magnetic member magnetically connecting said pole-pieces respectively to the pole-faces of said permanent magnet.

17. In a permanent-magnet device, a pair of magnetic members comprising at least segments respectively of a pair of magnetic rings having a common axis, said magnetic rings being spaced axially along said axis, a permanent magnet positioned between said magnetic members for establishing a magnetomotive force therebetween, and a pair of magnetic pole-pieces having substantial portions disposed between said magnetic members and connected respectively to said magnetic members, said magnetic pole-pieces being spaced to define a magnetic field therebetween.

18. In a permanent-magnet device, a pair of magnetic members comprising at least segments, respectively, of a pair of magnetic rings having a common axis, said magnetic rings being spaced axially along said axis, a permanent magnet positioned between said magnetic members for establishing a magnetomotive force therebetween, said permanent magnet comprising at least a segment of a frustum of a hollow cone magnetized along its slant height, and a pair of concentric magnetic pole-pieces having substantial portions disposed between said magnetic members and connected respectively to said magnetic members, said magnetic pole-pieces being spaced to define a magnetic field therebetween, said pole-pieces defining a cylindrical air-gap therebetween, a coil, and means mounting said coil for rotation about said axis with a side of said coil disposed in said air-gap.

19. A permanent-magnet device comprising a permanent-magnet member in the form of at least a segment of a frustum of a hollow cone, said magnetic member having pole-faces substantially at right angles to the axis of said cone, and a pair of pole-pieces for the pole-faces of said permanent magnet, each of said pole-pieces including at least a segment of a magnetic ring for engaging the associated pole-face of said magnet.

20. In a permanent-magnet device, a pair of spaced magnetic pole-pieces defining an air-gap substantially arcuate about a predetermined axis, an encircling, at least substantially U-shaped permanent magnet substantially surrounding said magnetic pole-pieces and said axis, said permanent magnet having at least a substantial component of magnetization in a direction parallel to said axis, means connecting said permanent magnet in magnetic series circuit relationship with said pole-pieces to establish a magnetic field in said air-gap, and a magnetic shunt for adjusting the magnetic field between said pole-pieces, said magnetic shunt comprising a magnetic member extending across a first pole of said permanent magnet, and having a portion extending into proximity to the pole-piece associated with a second pole of said permanent magnet.

21. In a permanent-magnet moving-coil device a permanent magnet in the form of at least a segment of a frustum of a hollow right circular cone magnetized along its slant height, a pair of pole-pieces for said magnet having concentric surfaces spaced to define an arcuate air-gap therebetween and positioned substantially within said permanent magnet, the axis of said surfaces being parallel to the axis of said cone, a coil having a first side positioned in said arcuate air-gap, means mounting said coil for rotation about the axis of said surfaces, a magnetic shunt extending across an end of said permanent magnet, said magnetic shunt having a portion in proximity to one of said pole-pieces of polarity opposite to that of said end, and means for adjusting the magnetic circuit established by said shunt.

22. In a measuring instrument, a stator structure, a rotor structure including a shaft and a pointer, means mounting said rotor structure for rotation relative to said stator structure, a ring-shaped dial member substantially concentric about the axis of rotation of said shaft, said rotor structure projecting through the central opening in said dial member with said pointer positioned to sweep over the surface of said dial member in response to rotation of said shaft, a casing for said measuring instrument including a light-permeable window through which said dial member and pointer are visible, and a mask member secured to said stator structure, said mask member being positioned between said dial member and said window for substantially covering the opening in said dial member, said mask member being spaced from said dial member sufficiently to permit passage of said pointer therebetween.

23. In a device having magnetic pole-pieces defining an arcuate air-gap, means for directing magnetic flux through said pole-pieces and said air-gap, and means disposed in said air-gap for actuation by said magnetic flux, adjustable magnetic shunt means for adjusting the magnetic flux in said air-gap, said magnetic shunt means having an arcuate portion similar in contour to said air-gap, said portion being positioned adjacent one of said pole-pieces to guide magnetic flux away from said air-gap without undue distortion of the magnetic flux remaining in said air-gap.

24. In a device having a pair of spaced magnetic elements and means for establishing a magnetomotive force therebetween, means for adjusting the effective magnetic flux in the device, said adjusting means comprising a magnetic shunt having a plurality of portions defining parallel magnetic paths between said magnetic elements, securing means associated with one of said portions for positioning said magnetic shunt relative to said magnetic elements, and means for adjusting said magnetic shunt relative to said magnetic elements about said securing means for varying the magnetic flux shunted therethrough.

25. In a device having a pair of spaced first and second magnetic elements and means for establishing a magnetomotive force therebetween, means for adjusting the effective magnetic flux in the device, said adjusting means comprising a magnetic shunt having first and second ends positioned adjacent said first magnetic element, said magnetic shunt having an intermediate portion adjacent said second magnetic element, whereby said magnetic shunt defines parallel magnetic paths between said magnetic elements, means securing said first end to said first magnetic element, and means for adjusting said second end of the magnetic shunt relative to said magnetic elements for varying the magnetic flux shunted between said magnetic elements.

26. In a device having a pair of spaced first and second magnetic elements and means for establishing a magnetomotive force therebetween, means for adjusting the effective magnetic flux in the device, said adjusting means comprising a magnetic shunt having first and second ends positioned adjacent said first magnetic element, said magnetic shunt having an intermediate portion adjacent said second magnetic element, whereby said magnetic shunt defines parallel magnetic paths between said magnetic elements, means securing said first end to said first magnetic element, said magnetic shunt between said intermediate portion and said first end having a portion of reduced cross-section proportioned to saturate in response to magnetic flux directed therethrough by said magnetomotive force, and means for adjusting said second end of the magnetic shunt relative to said magnetic elements for varying the magnetic flux shunted between said magnetic elements.

27. In a device having a pair of spaced magnetic elements and means for establishing a magnetomotive force therebetween, means for adjusting the effective magnetic flux in the device, said adjusting means comprising a magnetic shunt having a pair of portions, said portions defining parallel magnetic paths proportioned to carry different amounts of magnetic flux between said magnetic elements, securing means associated with the portion of said magnetic shunt proportioned to carry the smaller of said amounts of magnetic flux for positioning said magnetic shunt relative to said magnetic elements, and means for flexing said magnetic shunt to vary the amount of magnetic flux shunted therethrough.

28. In a device having magnetic pole-pieces defining a substantially circular air-gap, means for directing magnetic flux through said air-gap, and means disposed in said air-gap for actuation by said magnetic flux; adjustable magnetic shunt means for adjusting the magnetic flux in said air-gap, said magnetic shunt means having a substantially circular portion concentric with said air-gap and positioned adjacent a first one of said pole-pieces, for guiding magnetic flux away from said air-gap without undue distortion of the magnetic flux remaining in the air-gap, said magnetic shunt extending adjacent spaced points of a second one of said pole-pieces, means securing said magnetic shunt to the last-named pole-piece at a first one of said points, and means for adjusting the position of said magnetic shunt relative to said pole-pieces at a second one of said points.

29. In a device having magnetic pole-pieces defining a substantially circular air-gap, means for directing magnetic flux through said air-gap, and means disposed in said air-gap for actuation by said magnetic flux; adjustable magnetic shunt means for adjusting the magnetic flux in said air-gap, said magnetic shunt means having a substantially circular portion concentric with said air-gap and positioned adjacent a first one of said pole-pieces, for guiding magnetic flux away from said air-gap without undue distortion of the magnetic flux remaining in the air-gap, said magnetic shunt extending adjacent spaced points of a second one of said pole-pieces, means securing said magnetic shunt to the last-named pole-piece at a first one of said points, and means for adjusting the position of said magnetic shunt relative to said pole-pieces at a second one of said points, said shunt having a cross-section adjacent the first one of said points proportioned to saturate for preventing substantial magnetic flux from passing through the portion of said shunt secured to the second one of said pole-pieces.

30. In an instrument utilizing magnetic flux, a magnetic structure having an air-gap, said magnetic structure comprising a magnetic pole-piece having a substantially cylindrical outer surface, said magnetic pole-piece having an opening eccentrically positioned therein to provide an annular formation of said magnetic pole-piece having a radial cross-section varying from a predetermined size to a smaller size, a magnetic pole-member having an inner substantially cylindrical inner surface substantially surrounding said outer surface to define therewith said air-gap, and means for directing magnetic flux through said magnetic pole-piece in a path such that substantially all magnetic flux passing through said cylindrical outer surface also passes through said cross-section of predetermined size.

31. In an electroresponsive measuring instrument, a dial assembly, a pointer assembly projecting through said dial assembly; said pointer assembly including a pointer and means mounting said pointer for movement across said dial assembly, a window member through which said pointer and dial assembly may be viewed, and an opaque mask secured to said dial assembly, said opaque mask extending over said dial assembly and pointer intermediate said window member and said dial assembly, said mask being proportioned to conceal the portion of said dial assembly through which the pointer assembly projects, and said mask having a periphery spaced from the periphery of said dial assembly for exposing a substantial portion of said pointer.

32. In a measuring instrument, a dial assembly having a circular scale thereon, said dial assembly having a centrally disposed opening concentric with said scale; a pointer assembly projecting through said opening; said pointer assembly including a pointer extending from said opening towards said scale, and means mounting said pointer for rotation across said dial assembly to indicate different quantities on said scale; a window member through which said pointer and dial assembly may be viewed, and a substantially opaque mask attached to said dial assembly and positioned intermediate said window and said pointer assembly, said window being removable from said dial assembly independently of said mask, said mask being proportioned to conceal said opening, and said mask having a periphery spaced substantially from said circular scale for exposing a substantial portion of said pointer.

33. In an electromagnetic device, a magnetic structure comprising a magnetic core having a surface substantially cylindrical about an axis, said magnetic core having an opening extending therethrough substantially in the direction of said axis, said magnetic core having a channel extending radially therethrough from said opening to the exterior of said magnetic core, said opening being proportioned to provide an annular magnetic core having a cross-section tapering from a predetermined value adjacent a first side of said channel, to a smaller value adjacent a second side of said channel, means for directing through said magnetic core and said cylindrical surface in series a magnetic flux which tapers from a predetermined magnitude in the cross-section of predetermined value to a smaller magnitude in the cross-section of smaller value, a coil having a portion adjacent said cylindrical surface, and means mounting said coil for rotation about said axis.

VERON S. THOMANDER.